United States Patent
Colla (10) Patent No.: US 10,569,929 B2
(45) Date of Patent: Feb. 25, 2020

(54) COLLAPSIBLE AND REUSABLE CONTAINER OF LIQUIDS

(71) Applicant: CONTAINEREVOLUTION S.r.l., Palazzolo sull'Oglio (BS) (IT)

(72) Inventor: Giovanni Colla, Palazzolo sull'Oglio (IT)

(73) Assignee: CONTAINEREVOLUTION S.R.L., Palazzolo Sull'oglio (IT)

( * ) Notice: Subject to any disclaimer, the term of this patent is extended or adjusted under 35 U.S.C. 154(b) by 0 days.

(21) Appl. No.: 15/738,540

(22) PCT Filed: Jun. 23, 2015

(86) PCT No.: PCT/IB2015/054698
§ 371 (c)(1),
(2) Date: Dec. 20, 2017

(87) PCT Pub. No.: WO2016/207695
PCT Pub. Date: Dec. 29, 2016

(65) Prior Publication Data
US 2018/0186507 A1    Jul. 5, 2018

(51) Int. Cl.
*B65D 6/16* (2006.01)
*B65D 77/06* (2006.01)
(Continued)

(52) U.S. Cl.
CPC .............. *B65D 11/18* (2013.01); *B65D 75/38* (2013.01); *B65D 77/04* (2013.01); *B65D 77/06* (2013.01);
(Continued)

(58) Field of Classification Search
CPC ........ B65D 11/18; B65D 75/38; B65D 77/06; B65D 77/04; B65D 2577/041; B65D 35/14; B65D 11/20; Y02W 30/807
See application file for complete search history.

(56) References Cited

U.S. PATENT DOCUMENTS 1,619,120 A * 3/1927 Heaton ................ A62C 13/003
                                                            222/105
2,013,358 A * 9/1935 Osborne ................... A45F 3/00
                                                            169/30
(Continued)

FOREIGN PATENT DOCUMENTS

DE         2403419 A1    8/1975
EP         1501750 A1    2/2005
(Continued)

*Primary Examiner* — David P Angwin
*Assistant Examiner* — Bob Zadeh
(74) *Attorney, Agent, or Firm* — Volpe and Koenig, P.C.

(57) ABSTRACT

A container (1) for liquid is described, comprising a base (2), a lid (3), a jacket (4) and an inner bag (5). The jacket extends (4) between the base (2) and the lid (3), defining with them a closed inner volume. The inner bag (5) is interchangeably positioned in the inner volume and can be filled with a liquid. In the filled configuration, the inner bag (5) holds upright the container; in the emptied configuration the inner (5) bag is bent on itself and the container is collapsed with the lid (3) close to the base (2) or in abutment thereon. The jacket (4) is a tubular member made of a laminar material that can be bent on itself like a textile, for example a band that can be bent like bellows. This feature allows switching easily from the upright configuration to the collapsed or bent one, without the need—as in solutions of the known art—to overturn rigid parts, disassemble envelopes or guide the rings defining the metal meshes.

15 Claims, 6 Drawing Sheets

(51) Int. Cl.
  *B65D 77/04* (2006.01)
  *B65D 75/38* (2006.01)
  *B65D 6/00* (2006.01)
  *B65D 35/14* (2006.01)

(52) U.S. Cl.
  CPC .............. *B65D 11/20* (2013.01); *B65D 35/14* (2013.01); *B65D 2577/041* (2013.01); *Y02W 30/807* (2015.05)

(56) References Cited

U.S. PATENT DOCUMENTS

| | | | | |
|---|---|---|---|---|
| 2,042,288 A * | 5/1936 | Bach | ................. | A47J 47/12 15/DIG. 9 |
| 3,223,289 A * | 12/1965 | Bouet | ................. | A45D 40/00 222/209 |
| 3,240,394 A * | 3/1966 | Modderno | ................. | B65D 83/62 222/95 |
| 4,017,020 A * | 4/1977 | Frank | ................. | B65D 75/5883 222/541.1 |
| 4,098,434 A * | 7/1978 | Uhlig | ................. | B65D 83/0055 222/105 |
| 4,147,282 A * | 4/1979 | Levy | ................. | B05B 9/0838 222/387 |
| 4,211,091 A * | 7/1980 | Campbell | ................. | A45C 11/20 383/110 |
| 5,059,182 A * | 10/1991 | Laing | ................. | A61M 5/1483 222/95 |
| 5,192,134 A * | 3/1993 | Polett | ................. | B65D 88/1618 383/105 |
| 5,265,766 A * | 11/1993 | Kurtzahn | ................. | B65D 77/06 141/18 |
| 5,366,090 A | 11/1994 | Schuetz | | |
| 5,526,957 A * | 6/1996 | Brown | ................. | B29B 7/7404 222/94 |
| 6,082,896 A * | 7/2000 | Pulli | ................. | B65D 81/3897 383/110 |
| 6,247,619 B1 * | 6/2001 | Gill | ................. | A45F 3/20 222/105 |
| 6,431,435 B1 | 8/2002 | Jones et al. | | |
| 6,843,390 B1 * | 1/2005 | Bristor | ................. | B05B 11/3081 222/145.5 |
| 6,874,938 B2 * | 4/2005 | Price | ................. | A23L 3/01 383/104 |
| 6,995,099 B1 * | 2/2006 | Nishimura | ................. | B29C 70/083 442/59 |
| 7,896,199 B2 * | 3/2011 | Kaczmarek | ................. | B65D 75/525 137/614.2 |
| 2001/0023572 A1 * | 9/2001 | Savage | ................. | B65D 77/06 53/432 |
| 2003/0205581 A1 * | 11/2003 | Wertenberger | ................. | B65D 77/06 222/94 |
| 2003/0231808 A1 * | 12/2003 | Machacek | ................. | B65D 33/2591 383/36 |
| 2006/0096990 A1 * | 5/2006 | Reed | ................. | B65D 88/16 220/507 |
| 2008/0142545 A1 * | 6/2008 | Priolo | ................. | B65D 25/16 222/105 |
| 2008/0226207 A1 * | 9/2008 | Frayne | ................. | B65D 33/01 383/109 |
| 2008/0267540 A1 * | 10/2008 | Ashworth | ................. | A45C 3/00 383/81 |
| 2008/0272146 A1 * | 11/2008 | Kaczmarek | ................. | B65D 75/525 222/105 |
| 2008/0302819 A1 * | 12/2008 | Stuart | ................. | B65D 77/06 222/95 |
| 2009/0114311 A1 * | 5/2009 | McDowell | ................. | B65D 5/545 141/316 |
| 2009/0188736 A1 * | 7/2009 | Niddam | ................. | A45C 5/14 180/167 |
| 2009/0234287 A1 * | 9/2009 | Temple | ................. | A61M 5/1483 604/113 |
| 2010/0147871 A1 * | 6/2010 | Haas | ................. | B67D 1/0462 222/1 |
| 2012/0273485 A1 | 11/2012 | Lapoint et al. | | |
| 2018/0186507 A1 * | 7/2018 | Colla | ................. | A45C 5/14 180/167 |

FOREIGN PATENT DOCUMENTS

| | | |
|---|---|---|
| EP | 2476634 A2 | 7/2012 |
| WO | 2006116428 A2 | 11/2006 |
| WO | 2011159979 A1 | 12/2011 |

* cited by examiner

COLLAPSIBLE AND REUSABLE CONTAINER OF LIQUIDS

FIELD OF THE INVENTION

The present invention refers to a container of liquids, of the collapsible and several-times reusable type.

BACKGROUND OF THE INVENTION

A number of technical solutions have been proposed to allow liquids to be road transported in reusable containers. When the containers are not disposable, there is the need to return them to the sender to be reused several times.

Containers known with the acronym bag-in-drum are provided with an outer and substantially rigid shell inside which a bag is positioned and made of a polymeric film, for example polyethylene, polypropylene or polyurethane. The bag is intended for being filled by the sender with the liquid to be carried; once it reaches the destination, the bag is emptied and squashed. In order to aid the emptying of the bag and to avoid liquid remains in its inside, the addressee flows pressurized air in the outer shell to squash the bag and thereby achieve the complete ejection of the fluid initially contained.

EP 1501750 and EP 2476634 describe solutions of this type.

Containers have been proposed which are also collapsible in addition to have the inner bag. This feature allows minimizing bulks of empty containers, therefore being handier to manipulate and return to sender.

U.S. Pat. Nos. 5,366,090, 6,431,435, US 2012/0273485 and WO 2011/159979 describe this type of containers.

The Applicant found a drawback in solutions of the prior art, just concerning the possibility of collapsing the used containers and filling them again.

More in detail, outer shells of containers are rigid and box-shaped, as in examples described in U.S. Pat. No. 6,431,435, in US 2012/0273485 or in WO 2011/159979, or else they are reticular, i.e. defined by nets in metal meshes, as in the example described in U.S. Pat. No. 5,366,090.

In case of box-shaped shells, the walls are substantially rigid and not flexible since they have structural function: they must sustain the full container. When the inner bag has been emptied, an operator must manually pull down the shell walls, one on another. Vice versa, before filling again the inner bag, an operator must erect the shell by manually raising the respective parts, and in case constrain them one another by ropes or mechanical fastening.

On the contrary, the reticular shells have no structural function, but they are useful only for confining the inner bag inside a predefined volume, so that it can not do a belly-flop or overturn, the fluid pressure in the inner bag holding upright the container. An operator has to check if the metal rings defining the net meshes move correctly during the filling and the emptying of the inner bag. For example, horizontal rings must slide vertically, without jamming, on vertical metal rods defining the posts, towards the base or upwards, depending whether the shell has to be collapsed or erected. Among other things, when the container is erected, the operator must manually move the metal rings to their position next to the apposite recesses obtained on the posts.

Therefore, the active intervention of an operator is in any case necessary and this entails risks for his safety and delays in filling and emptying each batch of containers to be moved.

SUMMARY OF THE INVENTION

The object of the present invention is to provide a container for liquids of collapsible and reusable type, solving the drawbacks of known solutions.

Therefore the present invention relates to a container for liquids according to claim 1.

In particular, the container comprises a base, a lid, a jacket and an inner bag. The jacket extends between the base and the lid, defining with them an inner volume closed with respect to the surrounding environment, which is air-tight and liquid-tight.

The inner bag is interchangeably positioned in the inner volume of the container and can be filled with a liquid, for example 100 liters. In the filled configuration, the inner bag holds upright the container thanks to the hydrostatic pressure the liquid applied in its inside, the lid being raised and far from the base; in the emptied configuration the inner bag is bent on itself and the container does not remain upright but collapsed with the lid close to the base or in abutment thereon.

Advantageously, the jacket is not rigid and is not a metal mesh; it is a tubular member (not having necessarily a circular section) made of a laminar material that can be folded on itself like a textile, for example a band that can be folded like bellows. This feature allows switching easily from the upright configuration to the collapsed or folded one, without the need—as in solutions of the prior art—to overturn rigid parts, disassemble envelopes or guide the rings defining the metal meshes.

In practice, the jacket goes limp as a textile and the lid automatically moves towards the container base, without the need of operator intervention, apart from initially guiding the lid movement. The empty container has bulk strongly smaller than the full container, and therefore is easier to handle and carry.

Furthermore, the jacket surrounds the inner bag and protects it against collisions, scratches and puncturing, thereby assuring that the bag will not tear or the liquid cannot leak during transportation. In the preferred embodiment the jacket is resistant to puncturing and is scratch-proof.

The liquid can be of every nature, for example water, oil, a food preparation, glaze, honey, etc.

Preferably the jacket is a band of polymeric material, for example a band spliced to have the tubular shape necessary to surround the inner bag laterally. The jacket can be constituted by a single layer of polymeric material or else by several coupled layers (multi-layer) made of a single polymeric material or different polymeric materials.

In an embodiment the Applicant tested yet, the jacket is a band made of polyvinyl chloride PVC. The thickness is preferably comprised between 1 mm and 5 mm.

Preferably, in addition to be made starting from a PVC band, the jacket is coupled to a reinforcing weft, named reinforcing net, made of polymeric material too. Practically, the reinforcing net is a jacket layer serving to maximize mechanical properties. For example, the reinforcing net is provided at the inner surface of the jacket.

In its turn, the reinforcing net can be made of a synthetic textile, for example selected from PVC, polypropylene, polyethylene, etc. For example, the coupling with the PVC band is carried out by hot processing.

Alternatively, the jacket is an envelope made of synthetic textile, possibly plasticized.

In the preferred embodiment the jacket, the base and the lid are circular, and therefore the container has cylindrical shape allowing an optimal distribution of pressure applied by the liquid contained in the inner bag.

In a constructive embodiment, the jacket is made like bellows, i.e. it comprises a plurality of reinforcing rings, for example metal rings arranged at different heights, which allow the jacket to extend and fold just like bellows. Also if made in this way, the jacket is easy to be folded on itself as the inner bag is emptied.

Preferably, the base and the lid are rigid, solid, and on the contrary the inner bag is a flexible film, for example made of polyethylene. The thickness of the film is lower than 4 mm.

The container further comprises adduction means to adduct the liquid into the inner bag and draining means to drain the liquid, in addition to adduction means to adduct pressurized gas into the inner volume, between the jacket and the inner bag so that the latter is completely emptied.

For example, the adduction means and the draining means to adduct/drain the liquid into/from the inner bag comprise a lower connector positioned in the base to be coupled with an outside adduction/draining line. The connector is nothing else than a mouth usable for filling and emptying the inner bag. The lower connector is preferably made of polypropylene.

For example, the adduction means to adduct pressurized gas comprise an upper connector positioned in the lid to be coupled with an outer line feeding pressurized gas, for example compressed air at 0.5 bar.

When the inner bag has to be emptied, typically when the container reaches its destination, the addressee provides for the connection between a line of compressed air to the upper connector and from a draining line to the lower connector. The compressed air applies a pressure to the inner bag sufficient to guarantee the complete emptying of liquid along the draining line.

In the preferred embodiment, the base comprises a plurality of lower feet and the lid comprises corresponding upper feet. Each of the upper feet moves in abutment against the corresponding lower foot when the inner bag is empty, i.e. when the container has collapsed on itself, so that the lid rests directly on the base. The use of feet allows leaving sufficient space so that the jacket can bend on itself, and furthermore the container becomes stackable since the weight of possible other containers stacked thereon will lean directly on the base and not on the jacket.

Preferably, the lid is provided with an upper opening hermetically sealed by a removable stopper. The inner bag can be taken out, when empty, through the opening for its replacement. The operation is simple and be carried out also by not-skilled persons.

Preferably, the inner bag is underneath provided with a flange for the sealed coupling, and decoupling, with the lower connector. During the replacement of the inner bag, is therefore necessary to unscrew the flange of the bag to be replaced and to screw the flange of the new bag put in the jacket. For this reason, conveniently the opening in the lid allows a hand to be inserted.

Preferably, the contained comprises a one-way valve to vent the air from the inner volume when the inner bag is filled. Alternatively, the container comprises a double-acting valve, or else the upper connector for compressed air allows the air leakage from the inner volume when the line of compressed air is not connected.

LIST OF THE FIGURES

Further characteristics and advantages of the invention will be more evident from a review of the following specification of a preferred, but not exclusive, embodiment, shown for illustration purposes only and without limitation, with the aid of the attached drawings, in which.

DETAILED DESCRIPTION OF THE INVENTION

Figure 1:
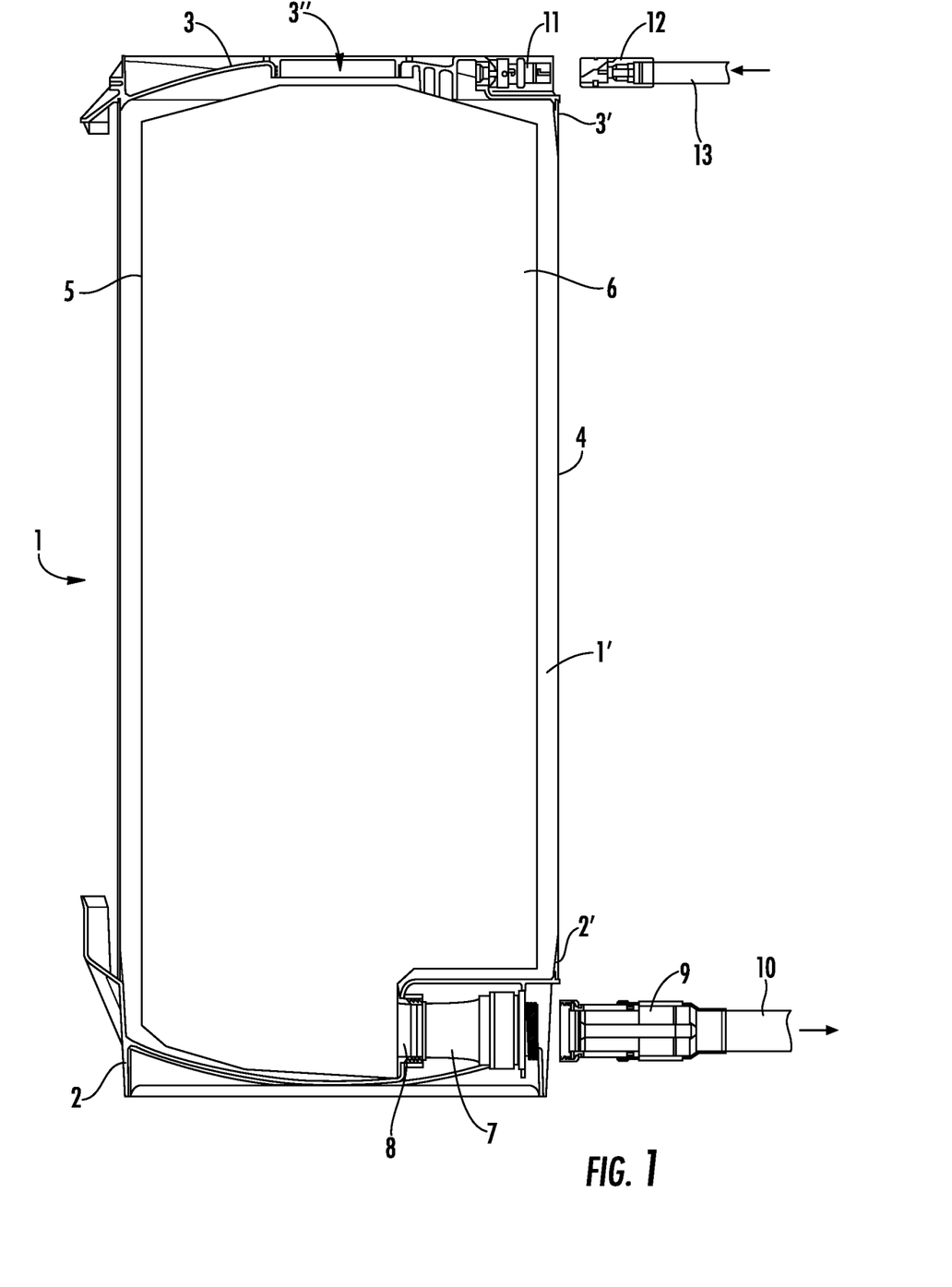
FIG. 1 is a schematic vertical sectional view of a container according to the present invention, in an upright configuration.

FIG. 1 shows a vertical sectional view of an example of container 1, according to the present invention, in an upright configuration.

The container 1 comprises a base 2 and a lid 3, both preferably rigid, for example made of high-density polypropylene, or ABS or else of polyvinyl chloride PVC. A jacket 4 extends between the base 2 and the lid 3; the members 2-4 together define the inner volume 1' of the container 1.

Preferably, the jacket 4 has a cylindrical shape to optimally distribute the hydrostatic pressure, as hereinafter explained.

In the example shown in FIG. 1, the jacket 4 is joined to the base 2 and the lid 3 along the circumferential welding lines 2' and 3', respectively. The coupling can be obtained by welding, gluing or mechanical systems, for example by retaining rings.

In the inner volume 1' an inner bag 5 can be interchangeably inserted, intended for containing a liquid 6, preferably a liquid such as water, oil, a food liquid such as a sauce or a preparation, treacle, a beverage, etc.

The lid 3 is provided with a central opening 3" closable by a stopper so that airtightness is guaranteed, through which a new flattened inner bag 5 can be inserted.

The inner bag 5 is collapsible until it becomes flat, and is made starting from a plastic film, for example made of polyethylene, polypropylene or polyurethane. The material is chosen as compatible with the liquid 6 to be contained, in compliance with current regulations.

A connector 7 is arranged in the base 2, preferably of quick plug-in type or alternatively of screw type, having the function of allowing the coupling and the releasing with a corresponding plug 9 mounted on an outer duct 10 for the filling or draining. The duct 10 is used by the sender to fill the bag 5 and by the addressee receiving the container, to withdraw the liquid 6 from its inside.

Preferably, as shown in figure, the connector 7 does not protrude from the base 2 but at most it remains flush with the outermost surfaces. This feature is useful to allow stacking and/or placing several containers 1 side by side.

The inner bag 5, next to its lower end, is provided with a flange 8 intended for meshing the connector 7, so that the tightness against liquid 6 is guaranteed.

When the inner bag 5 is necessarily replaced, an operator releases the flange 8 from the connector 7 and takes out the old bag 5 from the opening 3". The new bag 5 is inserted in place of it. The operation is extremely simple and does not require special skills.

The lid 3 is provided with a connector 11 that allows feeding compressed air, or another gas, into the inner volume 1' of the container 1, between the jacket 4 and the inner bag 5. The connector 11 allows the reversible coupling to an outer line 13, by means of a corresponding plug 12.

Preferably, as shown in figure, the connector 11 does not protrude from the lid 3, but at most it remains flush with the outermost surfaces. This feature is useful to allow stacking and/or placing several containers 1 side by side.

The selection of gas to be fed into the volume 1' evidently depends from the application the container 1 is intended for. For example, if the liquid 6 is a food liquid, the gas can merely be compressed air or else an inert gas, such as nitrogen or argon.

From now on, for simplicity only compressed air will be referred to.

The liquid 6 can leave the inner bag 5 by connecting the draining duct 10 to the connector 7. The outflow is initially caused by the gravity acting on the mass of liquid 6 contained in the inner bag 5, but if the compressed air would not be fed between the jacket 4 and the bag 5, by using the line 13 and the connector 11, the container 1 might be depressurized and a portion of the liquid 6 should remain trapped in the inner bag 5.

Then, by introducing compressed air, the inner bag 5 is completely emptied and all the liquid 6 initially contained therein is pushed into the draining duct 10.

In summary, in order to withdraw the liquid 6, then the addressee of the container 1 has nothing to do more than connecting the container to the draining line 10 and connecting the line 13 of the compressed air.

Differently from known solutions, the container 1 distinguishes itself in that the jacket 4 is not a rigid or overturnable wall, neither a complicated metal-net structure. The jacket 4 is a collapsible bag too, made of soft foldable textile, in its own not having the capability to hold upright the container 1. In other words, the jacket 4 by itself is not able to vertically move the lid 3 away from the base 2. The container 1 can be led to an upright configuration, that one shown in FIG. 1, only by the liquid 6 poured into the inner bag 5. The liquid 6 blows up the inner bag 5 and applies thereon a corresponding hydrostatic pressure that holds upright the container 1. The jacket 4 has the function of containing the inner bag 5, thereby avoiding it to go limp or deform undesirably, and of protecting it against puncturing and collisions.

Preferably, the jacket 4 is obtained by conveniently splicing a band made of flexible PVC, thereby joining the ends of a band to form a cylinder.

In order to impart greater strength to the jacket 4, the PVC band is preferably made with an inner weft, i.e. a weft obtained at the inner surface of the jacket 4. These bands are also called net-reinforced bands, as the weft looks like a net. For example, the weft can be obtained by applying twisted polyester threads on the PVC band.

Alternatively, the jacket 4 is obtained from a band made of a material selected from rubber, silicone, polyester, polyurethane, polyethylene, or a number of coupled multi-layered band, preferably net-reinforced as explained above.

Figure 2:
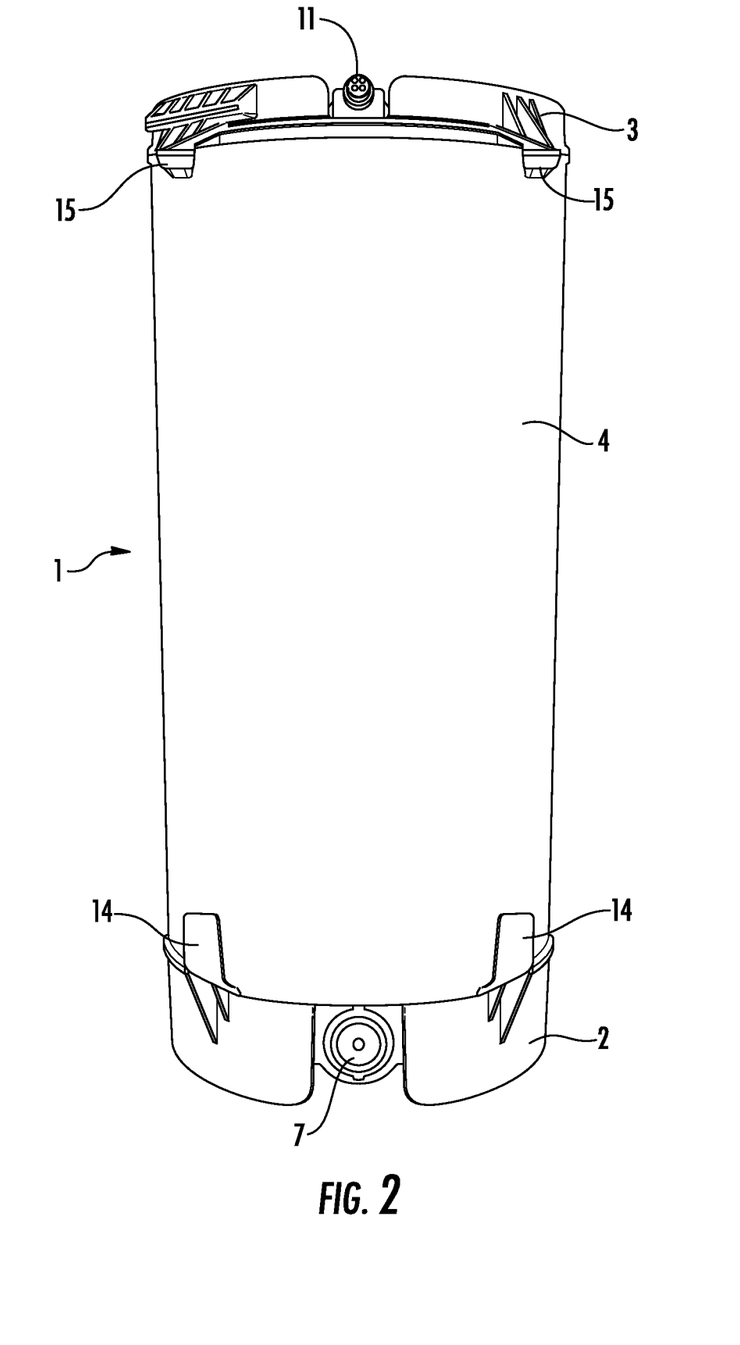
FIG. 2 is a photo showing a container according to the present invention, in elevation and upright configuration.

The FIG. 2 shows the preferred embodiment of the present invention. It deals with a photo of an operating container 1 that is upright since it is full of liquid 6.

The upper connector 11 for the inflow of compressed air and the lower connector 8 for draining the liquid 6 are shown frontally.

The base 2 and the lid 3 are made of rigid PVC; the jacket 4 is made of net-reinforced PVC textile.

With this configuration, as the liquid 6 is emptied from the container 1, the jacket 4 goes limp and bends like bellows, or according to a different bending scheme, until a minimum vertical bulk is achieved.

In order to be able to stack several empty containers 1, the base 2 and the lid 3 are respectively provided with a plurality of feet 14 and 15 opposing in pairs. In practice, when the container 1 is empty and the jacket 4 is bent on itself, each of the feet 15 of the lid 3 moves in abutment against a corresponding foot 14 of the base 2. In this way, the weight of additional containers 1 loaded on the lid 3 is transferred on the base 2, and from the latter to the ground, thereby avoiding damages of the jacket 4.

In the example shown in the enclosed figures, the container 1 has four lower feet 14, and four upper feet 15.

Figure 3:
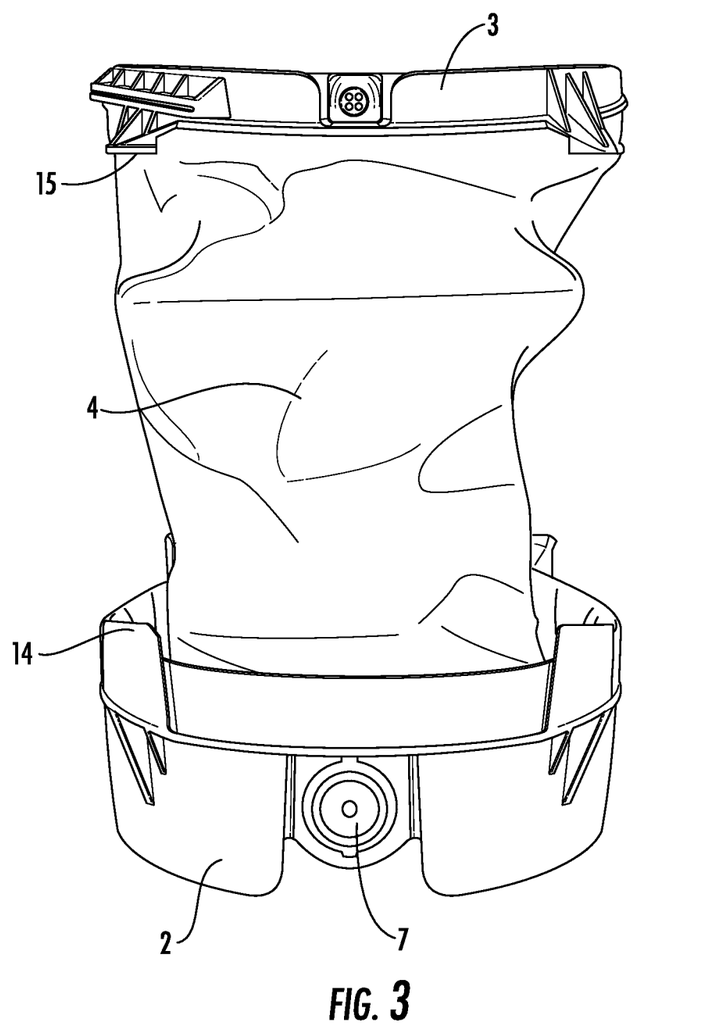
FIG. 3 is a photo showing the container of FIG. 2, in a partially collapsed configuration.

FIG. 3 shows the same container 1 of FIG. 2 in a different configuration, as partially emptied. For simplicity, the draining lines 10 and the adduction lines 13 of compressed air are not connected. As can be seen, the jacket 4 starts folding, as a textile.

Figure 4:
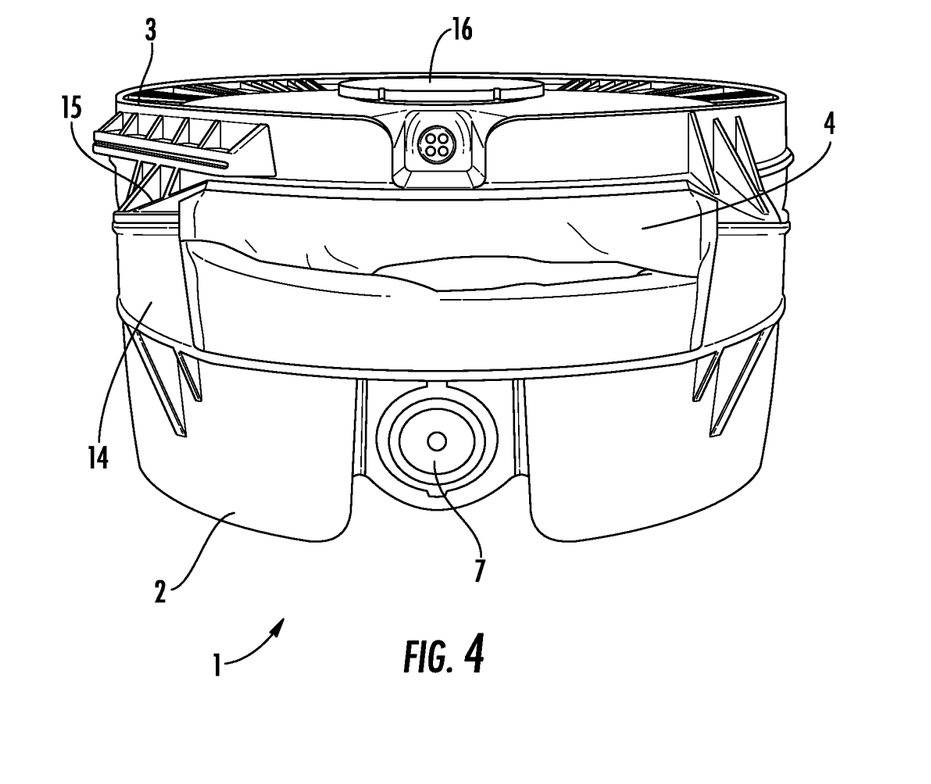
FIG. 4 is a photo showing the container of FIG. 2, in a completely collapsed configuration.

FIG. 4 shows a container 1 completely emptied and ready for being returned to the sender, or else stocked on a stack. The lid 3 is at the minimum distance possible from the base 2, with the feet 15 in abutment against the feet 14. The jacket 4 is folded on itself in the space left free between the base 2 and the lid 3.

In the configuration shown in FIG. 4, the container 1 can be stacked as explained above.

Advantageously, bulks of the container 1 become considerably much smaller than the same full container 1. This feature allows optimizing the use of spaces available in the store or on vehicles transporting the containers. Moreover, the so-collapsed container 1 is easy to handle also by only one person.

On the lid 3 a stopper 16 is visible and closes the opening 3" denoted in FIG. 1. The stopper 16 is liquid-tight and air-tight.

For replacing the inner bag 5, the user must unscrew the stopper 16 in order to access the inner volume of the jacket 4.

Figure 5:
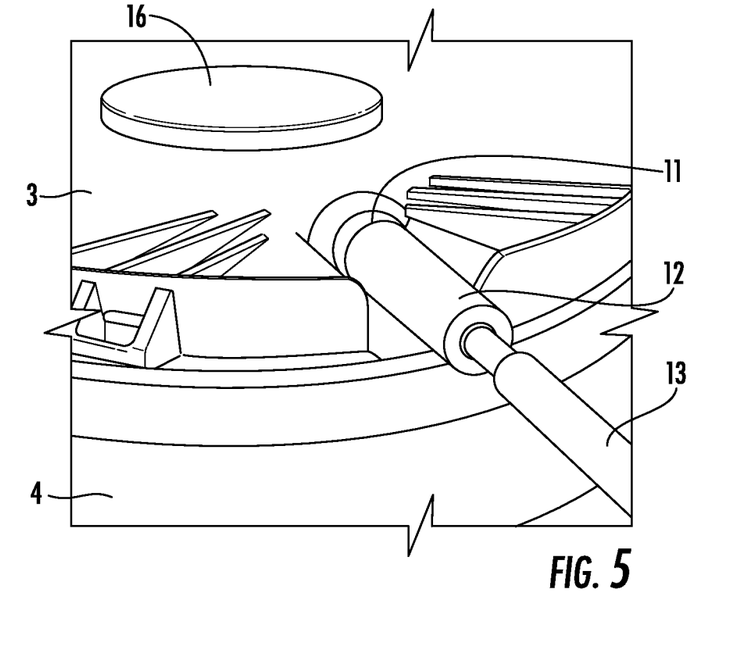
FIG. 5 is a photo showing a detail of the container of FIG. 2, in a configuration during the emptying thereof.

FIG. 5 shows in detail the lid 3 during the emptying of the container 1. The line 13 of compressed air is connected to the upper connector 11 by means of a plug 12. The compressed air, preferably at a pressure lower than 0.5 bar, applies such a force on the inner bag 5 to completely empty it from the liquid 6 flowing out through the draining line 10 (FIG. 1).

Figure 6:
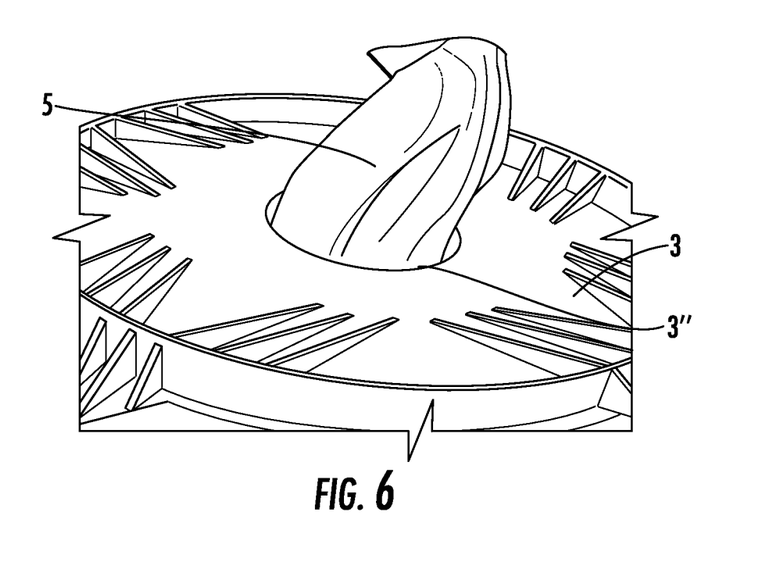
FIG. 6 is a photo showing a detail of the container of FIG. 2, in a partially disassembled configuration.

FIG. 6 shows the container 1 during the replacement of the inner bag 5. The stopper 16 has been removed and the bag 5 to be replaced (previously released from the flange 8) is taken out through the opening 3" of the lid 3.

Figure 7:
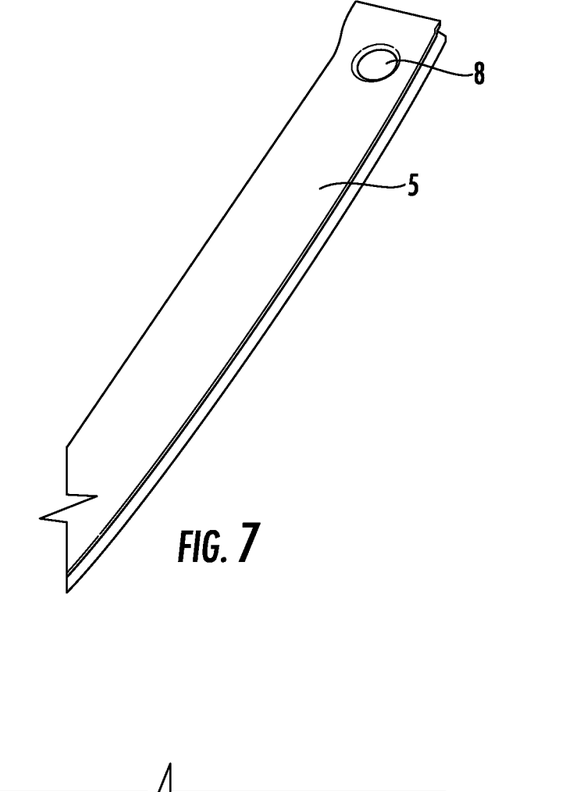
FIG. 7 is a photo showing a component of the container of FIG. 2.

FIG. 7 shows an operator with a new bag 5 ready to be used in the container 1 replacing that one previously taken out. The new bag 5 is bent on itself to be flat and easy to be inserted in the jacket 4 through the opening 3".

Figure 8:
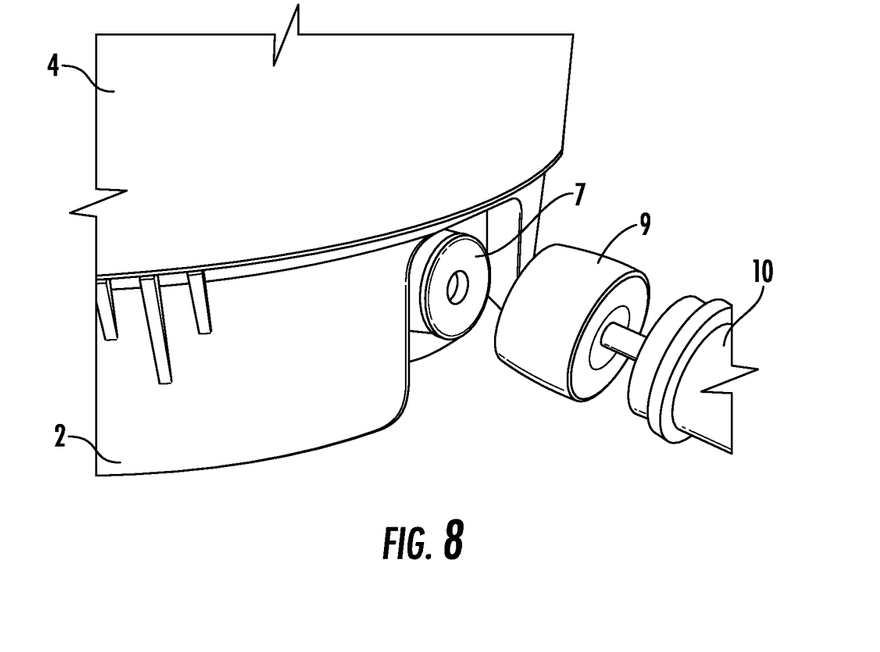
FIG. 8 is a photo showing a detail of the container of FIG. 2.

FIG. 8 shows in detail the base 2 of the container 1 when the operating is going to connect the draining line 10 to the connector 7 by means of the plug 9.

The connector 11 is preferably of two-way type, meaning that during the filing of the inner bag 5 with the liquid 6 it allows also the discharge in atmosphere of the air that might be contained in the inner volume 1'. Alternatively, the container is provided with an appropriate one-way valve mounted on the lid 3.

Referring to all the FIGS. 1-8, it is evident that the container 1 is an effective tool for anyone who has to carry liquids but wishes to reuse the container several times.

The invention claimed is:

1. A container (1) for liquids (6), comprising:
    a base (2),
    a lid (3),
    a jacket (4) extending between the base (2) and the lid (3), defining therewith a sealed inner volume (1'),
    an inner bag (5) interchangeably positioned in said inner volume (1'), wherein the inner bag (5) can be filled with a liquid (6) and wherein the inner bag (5), in a filled configuration, holds upright the container (1) with the lid (3) distal from the base (2) and in the emptied configuration it is folded on itself and the container (1) is collapsed with the lid (3) proximal to the base (2) or in abutment thereon, and
    adduction means (7, 3") to adduct the liquid (6) into the inner bag (5), draining means (7) to drain the liquid (6) from the container (1) and adduction means (11) to adduct pressurized gas into the inner volume (1') between the jacket (4) and the inner bag (5) so that the inner bag (5) is completely emptied
    the jacket (4) is a tubular member made of a soft foldable textile laminar material.

2. The container (1) according to claim 1, wherein the jacket (4) is a band of polymeric material, spliced to contain the inner bag (5) laterally, and constituted by a single layer or by several coupled layers made of a same polymeric material or different polymeric materials.

3. The container (1) according to claim 1, wherein the jacket (4) is resistant to puncturing and is scratch-proof.

4. The container (1) according to claim 2, wherein the jacket (4) is a band made of polyvinyl chloride PVC.

5. The container (1) according to claim 2, wherein the jacket (4) is a band made of polyvinyl chloride PVC coupled to a reinforcing weft, as a reinforcing net, also made of polymeric material.

6. The container (1) according to claim 5, wherein the reinforcing net is made of synthetic textile, selected from PVC, polypropylene, polyethylene, or other polymeric materials.

7. The container (1) according to claim 1, wherein the jacket (4) is an envelope made of synthetic textile.

8. The container (1) according to claim 1, wherein the jacket (4), the base (2) and the lid (3) are circular, and the container (1) has a cylindrical shape.

9. The container (1) according to claim 1, wherein the base (2) and the lid (3) are rigid and the inner bag (5) is a flexible film.

10. The container (1) according to claim 1, wherein the adduction means and the draining means to adduct or drain the liquid (6) into or from the inner bag (5) comprise a connector (7) positioned in the base (2) to be coupled with an outside adduction or draining line (10).

11. The container (1) according to claim 1, wherein the adduction means to adduct pressurized gas into the inner volume (1') comprise a connector (11) positioned in the lid (3) to be coupled with an outer line feeding pressurized gas.

12. The container (1) according to claim 1, wherein the base (2) comprises a plurality of lower feet (14) and the lid (3) comprises corresponding upper feet (15), and wherein each of the upper feet (15) moves in abutment against the corresponding lower foot (14) when the inner bag (5) is empty, so that the lid (3) rests directly on the base (2), thereby leaving sufficient space for the jacket (4) to be folded, and the container (1) is stackable.

13. The container (1) according to claim 1, wherein the lid (3) is provided with an upper opening (3") hermetically sealed by a removable stopper (16), and wherein the inner bag (5), when empty, can be taken out through the opening (3") for replacement.

14. The container (1) according to claim 1, wherein the inner bag (5) comprises a lower flange (8) for the sealed coupling, and decoupling, with the draining means (7) of the liquid (6).

15. The container (1) according to claim 1, comprising a one-way valve, or a double-acting valve, to vent the air from the inner volume (1') when the inner bag (5) is filled.

* * * * *